United States Patent [19]

Kurtz et al.

[11] Patent Number: 4,568,604
[45] Date of Patent: Feb. 4, 1986

[54] SYNTHETIC RESIN PRODUCT AND METHOD AND APPARATUS FOR MANUFACTURE THEREOF

[75] Inventors: James M. Kurtz; Robert C. Fulkerson, both of Cedar Rapids, Iowa

[73] Assignee: J & J Corp., #1, Cedar Rapids, Iowa

[21] Appl. No.: 567,188

[22] Filed: Dec. 30, 1983

[51] Int. Cl.⁴ ............................................. B32B 5/08
[52] U.S. Cl. ................................. 428/297; 428/324; 428/325; 428/330; 264/255; 264/308; 264/309
[58] Field of Search ............... 428/228, 237, 238, 239, 428/241, 246, 251, 268, 273, 324, 325, 283, 285, 240, 287, 297, 330; 264/255, 308, 309

[56] References Cited

U.S. PATENT DOCUMENTS

| | | | |
|---|---|---|---|
| 3,396,067 | 8/1968 | Schafer | 428/331 |
| 4,244,993 | 1/1981 | Platka, III et al. | 264/309 |
| 4,247,364 | 1/1981 | Culp | 428/324 |
| 4,267,285 | 5/1981 | Brontman | 428/297 |
| 4,369,224 | 1/1983 | Cordts et al. | 428/287 |
| 4,374,892 | 2/1983 | Roberts | 428/324 |
| 4,463,041 | 7/1984 | Takuji et al. | 428/283 |
| 4,486,494 | 12/1984 | Eldin | 428/273 |

FOREIGN PATENT DOCUMENTS 726567   3/1955   United Kingdom ............... 428/228

OTHER PUBLICATIONS

The Merck Index (1976), p. 215, #1705.

*Primary Examiner*—George F. Lesmes
*Assistant Examiner*—William M. Atkinson
*Attorney, Agent, or Firm*—Berman, Aisenberg & Platt

[57] ABSTRACT

A filler which imparts heat dissipating and shrinkage reduction characteristics to a mixture of the filler with a synthetic resin. The mixture is useful for providing a layer between gel coat and a layer including glass fiber and resin to prevent the formation of small air voids. The filler imparts structural strength to resin so that a useful product may be made from only a layer of gel coat with a layer of the filler and resin. The filler is preferably a mixture of calcium silicate and mica, and in the preferred embodiment the calcium silicate is wollastonite. An improved apparatus for applying the mixture of synthetic resin and filler comprises a modified prior-art spray gun and a mixer which includes a plurality of augers for thoroughly mixing the filler with the resin. The preferred embodiment of the resin comprises a terpolymer mixed with styrene and having a Brookfield thixatropic index of from 2 to 4.

26 Claims, 4 Drawing Figures

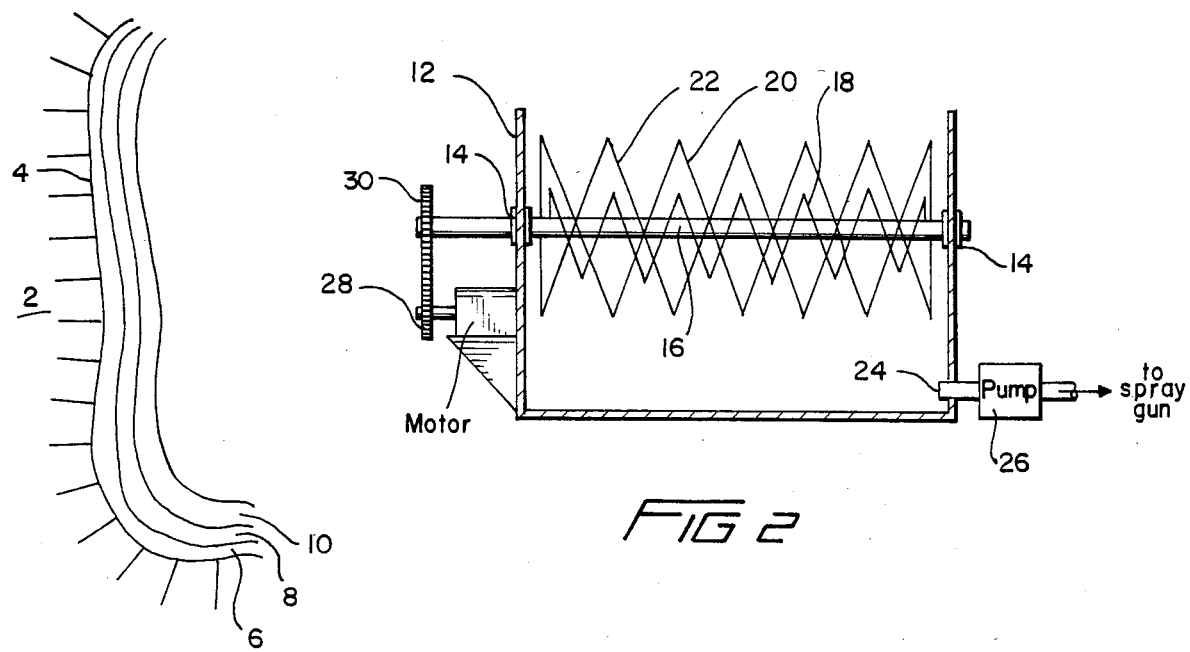
FIG 1
FIG 2
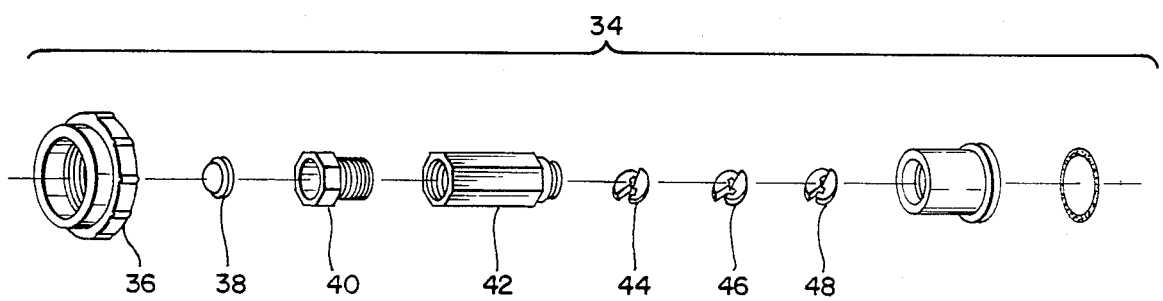
FIG 3B
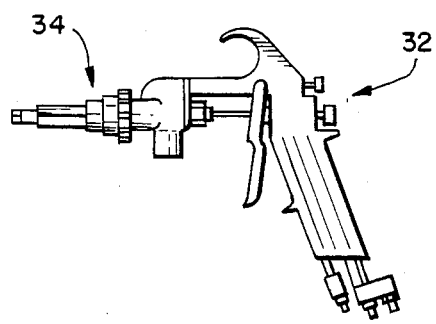
FIG 3A

SYNTHETIC RESIN PRODUCT AND METHOD AND APPARATUS FOR MANUFACTURE THEREOF

TECHNICAL FIELD

This invention relates to the art of plastic products which are reinforced with glass fiber and includes the art of manufacturing such products.

BACKGROUND ART

Glass-fiber-reinforced plastic products, such as the hull of a boat, a shower stall, a tank, a cowling, or the like, are typically made with known glass fiber which may be that bearing the trademark Fiberglas. These products are generically known as Fiberglas-reinforced parts (FRP) and include at least one layer of glass fibers mixed with synthetic resin to provide rigidity.

In a known glass-fiber-reinforced product, a woven sheet of glass fibers is placed on a gel coated surface and saturated with synthetic resin. After the resin has cured, the product (resin-backed gel coat) is removed from the surface and placed in use. Many times, the product is made with several layers of a glass-fiber-material soaked with resin to produce a thicker, stronger product.

In another method, a formulation of glass fibers, known as Fiberglas chop, is mixed with resin to provide structure for a glass-fiber-reinforced product. This is advantageous since the chop may be sprayed into a mold and mixed with resin during or prior to the spraying of the resin. This process is preferred in many instances since it is much faster than using a layer of woven glass fiber and is thus much less expensive.

A number of glass-fiber-reinforced products include a gel coat as a first layer of the product. Gel coat is a resin-based material which is applied to a mold surface; it gels prior to placing further plastic material in the mold. The gel coat becomes an integral part of the finished laminate; it establishes surface characteristics and appearance. Thus, when using Fiberglas chop, a layer of gel coat is applied to the surface of the mold and Fiberglas chop (mixed with resin) is then sprayed onto the gel coat. This process results in the trapping of air between the layer of gel coat and the first layer of Fiberglas chop. Accordingly, the prior art process requires the step of rolling out the first layer (a thin "skin coat") of Fiberglas chop to remove air bubbles. After the air bubbles have been removed by this rolling out step, a heavy "back-up" layer of Fiberglas chop is ordinarily applied. This step of rolling out takes a substantial amount of time and adds significantly to the cost of the product.

The problem of air voids is explained in "Applications Manual for Cook's Polycor Polyester Resins and Gel Coats", published by Cook Paint and Varnish Company, Kansas City, Mo., Copyright 1978: "It is impossible to remove all air bubbles by contact molding, but their size and distribution is important. Large voids give a whitish appearance when using clear resin.

Since the most critical area is directly behind the gel coat, it is advisable to specify a light cloth or chop for the first layer. Surface pits also must not be predominant."

Another problem of the prior art is known as "black plague." This is a blackening of gel coat caused by combination of cobalt in the gel coat with calcium hypochlorite, for example, contained in water in a spa.

SUMMARY OF THE INVENTION

In accordance with the invention, the problem of air voids between the gel coat and the first layer of glass fiber material is solved by placing a layer of synthetic resin and filler on the layer of gel coat before the glass fiber material is applied. While this intermediate layer serves primarily as an air barrier, tests have shown that it also imparts superior physical properties.

In a preferred embodiment, a mold is first covered with gel coat, a thin layer of synthetic resin and filler is then sprayed on the gel coat, and Fiberglas chop (mixed with resin) is then sprayed on the layer of synthetic resin and filler. The thus-provided intermediate layer of synthetic resin and filler acts as an air barrier. Minor air (small bubbles or voids) no longer is cause for concern; only major air (large bubbles or voids) need be attended to. Even though a thin "skin coat" of Fiberglas chop is replaced by a single thick coat, major air is readily detected and can be rolled out in a single operation.

Use of the intermediate layer of filler and synthetic resin eliminates the prior art step of rolling out the air bubbles in the skin layer of Fiberglas chop, and the product made in accordance with the invention is accordingly much less expensive to manufacture. The intermediate layer is also sufficiently compatible with the Fiberglas chop skin coat to avoid harmful air entrapment therebetween.

The synthetic resin is preferably a polyester resin, e.g. a terpolymer of orthophthalic anhydride, maleic acid and propylene glycol, which is mixed with styrene to maintain the latter in fluid form. The filler is preferably a mixture of calcium silicate and mica; in the preferred embodiment, the calcium silicate is the mineral, wollastonite.

It appears that the use of the preferred filler is advantageous because of its heat dissipation properties. Tests have shown that the heat generated by the exothermic curing of the resin does not affect the gel coat when this filler is used.

The filler is one which, in the amount used, will dissipate heat and eliminate or substantially reduce shrinkage during cure. An example of such a filler is the mixture of calcium silicate and mica.

The method of applying the mixture of resin and filler includes the use of a modified prior art spray gun and a novel mixer. The spray gun, a Binks model 18NCD, has been modified to have three mixing blades instead of the two as known in the art. A spray nozzle also is provided having a diameter adequate to allow the thick mixture to be sprayed. The mixer has three oppositely-directed mixing screws for thoroughly mixing the resin and filler, and a pump for supplying the mixture to the spray gun. The mixture is supplied at a somewhat high pressure, necessitating the use of a high-pressure pump for supplying catalyst to the spray gun.

It is an object of this invention to provide a novel product having a layer of gel coat, a layer consisting essentially of synthetic resin and filler, and a layer of glass fiber and resin.

It is a further object of this invention to provide a method of manufacturing a product reinforced with glass fiber wherein a layer of gel coat is applied to the mold, an air barrier is applied to the gel coat, and a glass fiber material (mixed with resin) is applied to the air barrier.

It is a still further object of this invention to provide a novel air barrier for use with gel coat and glass fiber layers wherein the air barrier includes a mixture of calcium silicate and mica.

It is another object of the invention to provide a novel compound which is useful as an air barrier, to increase the strength of a plastic product, or for application to other materials to provide, for example, corrosion-resistance properties.

BRIEF DESCRIPTION OF THE DRAWINGS

FIG. 1 is a schematic representation showing a product made in accordance with the invention.

FIG. 2 is a cross-section of a mixer in accordance with the invention.

FIG. 3A shows a prior art spray gun having a modified nozzle.

FIG. 3B shows an exploded diagram of the nozzle portion of a modified spray gun.

DETAILED DESCRIPTION OF THE INVENTION

FIG. 1 illustrates a product being manufactured in accordance with the principles of the invention. A mold 2 has an exterior surface 4 which is configured to a pre-determined, desired shape. A layer 6 of gel coat is first placed on the surface 4 of the mold, preferably by spraying. Then, an air barrier 8, the composition of which will be described in detail hereafter, is sprayed on the gel coat layer 6. As a final step, a mixture 10 of glass fiber and plastic resin is sprayed on the air barrier layer 8. After the plastic resin has cured, the product is removed from the mold for further processing such as trimming, adding decorative items, or the like.

The mold 2 may be of any type known in the art of glass-fiber-reinforced products. Also, it may be desirable, as is known in the art, to provide a coating of releasing agent on the surface 4 to facilitate separation of the glass fiber product from the mold. Gel coats are known materials and comprise resin which becomes an integral part of the product to improve surface appearance and otherwise impart surface characteristics. Any standard gel coat used for a particular application is suitable for use for the same application with the subject barrier back-up layer.

An important feature of the invention is the use of the air barrier layer 8 between the gel coat and glass fiber layers 6 and 10.

The composition of the material used to provide the air barrier 8 is preferably as set forth in the following table.

TABLE I

| (Air Barrier) | |
|---|---|
| Component | Wt. % |
| Nyad G | 27 |
| Nyad 325 | 16 |
| Mica | 5 |
| Synthetic resin | 52 |

Nyad G is wollastonite having a particle size which provides 0.88 m² of surface area per gram, and Nyad 325 is wollastonite having a particular size which provides 1.55 m² of surface area per gram. Mica is in the form of particles of about 325 mesh, and the product sold under the trademark Alsimica #88 is preferred. A mixture of Nyad G, Nyad 325, and mica according to Table I is sold under the trademark "Plaz-tec" and is the preferred composition for use in practicing the invention. This material acts as a filler which, in the preferred embodiment, has been found to provide an air barrier, increase the structural strength of the product, and provide a moisture impervious layer. Other fillers may be useful, and the word "filler" as used herein means a composition of less than about 50 mesh. Furthermore, the filler preferably has a heat-dissipation property to dissipate heat generated during cure of the synthetic resin.

The resin is preferably one obtained from Cook's Paint and Varnish Company, Kansas City, Mo. This resin preferably has a first component comprising orthophthalic anhydride, maleic acid and propylene glycol, and a second component comprising styrene. The first component is preferably 55 percent by weight of the total weight of the resin, while the styrene is about 45 percent by weight of the resin. The composition is preferably as shown in the following table.

TABLE II

| | (Synthetic Resin) | |
|---|---|---|
| Component | Mole Ratio | Wt. % |
| Orthophthalic acid | 2 | |
| Maleic acid | 1 | 55 |
| Propylene glycol | 3 | |
| Styrene | | 45 |

The preferred method for combining these components is to polymerize the orthophthalic acid, maleic acid and propylene glycol to a 98% conversion and to mix this terpolymer with the styrene at a temperature of between 100° and 115° F. and also to include cobalt salt as an accelerator in the amount of 0.05 to 0.45 percent by weight, and a thixotrope, which is preferably Cabosil or Aerosil (fused silica), in the amount of from 0.5 to 3 percent by weight.

While the preferred composition of the air barrier 8, including the synthetic resin, is given above, it will be appreciated that other formulations will be useful within the scope of the invention. The primary requirement of the resin is that it have the correct gel time, thixotropic properties, and cure rate. The resin preferably has a gel time of from 10 to 15 minutes, a thixotropic index of from 2 to 4 (when measured at 6 rpm and 60 rpm) and a cure rate of from 35 to 50. The stated thixotropic index is the Brookfield index, and the stated cure rate is measured with a Barcol meter with a 32 gram mass.

The glass fiber layer 10 is preferably a polyester resin mixed with Fiberglas chop so that it may be sprayed by a known spray gun. In the preferred embodiment, the resin is either an orthophthalic or an isophthalic resin, and these are known in the art. The glass fiber chop is also known and comprises pieces of glass fiber having lengths of about one inch.

FIG. 2 shows a schematic side view of a mixing apparatus for use in mixing the solid materials (Plaz-tec) with synthetic resin. This operation is important since the preferred composition is very thick and must be properly mixed in order to be sprayed onto a mold having a layer of gel coat. A container 12 is large enough to receive about 1,000 pounds of the mixture and includes bearings 14 which support a central shaft 16. Mounted to the shaft 16 are three helical mixing screws. An inner screw 18 has a pitch which moves the material in a first direction along the shaft 16, an intermediate screw 20 has a pitch which drives the material in an opposite direction, and a third screw 22 has a pitch which drives the material in the first direction. Each of these screws is mounted to the shaft 16 for common rotation. This combination of screws has been found to be particularly useful in mixing the preferred composition of resin and filler. The outer screw 22 preferably drives the material toward the outlet 24 which is connected to pump 26. The pump preferably has a 12:1 ratio. Also, the interior surface of the mixing apparatus 12 is preferably cylindrical so that the clearance between the inner surface of the mixing apparatus and the outer mixing screw 22 is very small. This prevents the build-up of material on the wall of the mixing apparatus 12.

The shaft 16 is driven by a motor 28 which has an output shaft preferably connected to the shaft 16 by a flexible belt 30.

The outlet of the pump 26 is connected to a spray gun, such as that shown in FIG. 3A. The preferred spray gun 32 is a Binks Model 18-NCD which has been modified to allow it to spray the mixture of resin and filler. The spray gun 32 receives the resin and filler from the pump 26 at one of its inlets, and catalyst at another of its inlets, as is known in the art.

The modification to the known Binks spray gun is shown in FIG. 3B. The nozzle 34 is shown in an exploded view and includes a mounting ring 36, a spray nozzle 38, an integrator 40, a mixing tube 42, and mixing blades 44, 46, and 48. The prior art spray gun employs only two of the mixing blades, but this prior art gun was found to be inoperative for spraying the mixture of resin and filler in accordance with the invention. Accordingly, after extensive research, the prior spray gun was modified to include a third mixing blade 48 which results in an operative spray gun when used with the composition of the invention. Also, the spray nozzle which is ordinarily supplied with the Binks 18 NCD gun has been replaced with a Binks #202 spray nozzle and modified to provide about a 40 degree spray angle.

The combination of the modified spray gun 32 having the new nozzle 38 and additional mixing knife 48, with the mixing apparatus shown in FIG. 2 results in a combination of elements which permits the mixture described in Table I to be applied by spraying it on a mold having a first layer of gel coat thereon. The spray gun preferably uses air pressure of 100 to 120 psi, and this requires a high-pressure catalyst pump to be used to supply the catalyst to the spray gun 32. The preferred catalyst pump is sold under the trademark Catapump and this is used because the high pressure supplied to the spray gun may force resin back into other types of catalyst-supplying structures.

In the preferred embodiment, a glass fiber reinforced product is constructed by applying a layer of gel coat on a mold. An air barrier of Plaz-tec and synthetic resin is then sprayed on the gel coat using the above-described apparatus to a thickness of from 1/16 to ⅛ inch. After the air barrier has cured, a layer of glass fiber chop mixed with resin is applied in a manner known in the art.

The mixture of resin and filler has been found to be useful even without the layer of glass fiber chop, and it is within the scope of the invention to construct a plastic product comprising a first layer of gel coat, and a second layer of an air barrier which consists essentially of synthetic resin and filler.

In addition, the composition which provides the air barrier in accordance with the invention has been found to be useful for corrosion-proofing other materials. For example, in one experiment, the composition used for the air barrier was sprayed onto a steel part, and such would provide an effective corrosion-proofing for the steel part. Other useful applications of the composition used for the air barrier may be apparent to those of skill in the art.

What is claimed is:

1. A process for making a chopped-glass-fiber-reinforced product comprising
    (a) covering a mold with a layer of gel coat, and
    (b) covering said layer of gel coat with a compatible layer consisting essentially of synthetic resin having a gel time of from 10 to 15 minutes, a Brookfield thixotropic index of from 2 to 4 and a cure rate of from 35 to 50 mixed with a heat-dissipating filler comprising calcium silicate and mica.

2. A process according to claim 1 wherein said synthetic resin comprises polyester resin.

3. A process according to claim 2 further comprising the step of placing a layer of glass fiber mixed with resin on said layer of synthetic resin and filler.

4. A process according to claim 3 wherein said step of placing a layer of glass fiber mixed with resin comprises spraying a layer of glass fiber chop.

5. An integral molded product comprising a first layer of gel coat and a second layer consisting essentially of
    a synthetic resin having a Brookfield thixotropic index of from 2 to 4, a gel time of between 10 and 15 minutes and a cure rate of from 35 to 50 inches per hour, when measured with a Barcol meter, mixed with
    a filler comprising calcium silicate and mica.

6. A product according to claim 5 wherein said resin comprises a polyester resin mixed with styrene.

7. A product according to claim 6 wherein said calcium silicate is wollastonite.

8. A product according to claim 7 wherein said calcium silicate comprises wollastonite having a first component with a primary particle size to provide a surface area of about 0.88 m$^2$ per gram and a second component having a primary particle size to provide a surface area of about 1.55 m$^2$ per gram.

9. A product according to claim 8 wherein said synthetic resin comprises a first part with units of orthophthalic acid, maleic acid and propylene glycol in an approximate mole ratio of 2:1:3, respectively, and a second part comprising styrene.

10. A product according to claim 9 wherein said first part is about 55% by weight of the total weight of said first and second parts.

11. An integral molded product having
    a first layer comprising gel coat,
    a second layer contiguous to said first layer and consisting essentially of a mixture of filler and a first synthetic resin, and
    a third layer contiguous to said second layer and comprising chopped glass fiber and resin compatible with the second layer;
    the filler comprising calcium silicate and mica, and the first synthetic resin having (a) a Brookfield thixotropic index of from 2 to 4, (b) a gel time of between 10 and 15 minutes and (c) a cure rate of from 35 to 50 inches per hour, when measured, with a Barcol meter.

12. A product according to claim 11 wherein said first synthetic resin comprises a first part with units of orthophthalic acid, maleic acid and propylene glycol in an approximate mole ratio of 2:1:3, respectively, and a second part of styrene.

13. A product according to claim 12 wherein said first part is about 55% by weight of the total weight of said first and second parts.

14. A product according to claim 13 wherein said synthetic resin further comprises a thixotrope.

15. A product according to claim 11 wherein the first synthetic resin comprises polyester resin.

16. A product according to claim 15 wherein said first synthetic resin is an orthophthalic anhydride/maleic acid/propylene glycol copolymer.

17. A product according to claim 15 wherein said calcium siliate is wollastonite and includes a mixture having at least two primary particle sizes.

18. A product according to claim 17 wherein said wollastonite comprises a first component having a primary particle size which provides a surface area of substantially 0.88 m²/gram and a second component having a primary particle size which provides a surface area of 1.55 m²/gram.

19. A product according to claim 18 wherein the weight of said first component represents approximately 27% of the total weight of said second layer, the weight of said second component represents approximately 16% of the total weight of said second layer, and the weight of said mica represents approximately 5% of the total weight of said second layer.

20. A product made by
 (a) covering a mold with a first layer of gel coat,
 (b) covering said layer of gel coat with a second layer consisting essentially of a compatible synthetic resin having a gel time of from 10 to 15 minutes, a Brookfield thixotropic index of from 2 to 4 and a cure rate of from 35 to 50 mixed with filler comprising calcium silicate and mica, and
 (c) covering said second layer with a third layer of chopped glass fiber mixed with resin compatabile with the second layer;
 the second layer being contiguous to both the first layer and the third layer.

21. A product according to claim 20 wherein said synthetic resin comprises a polyester resin.

22. A product according to claim 21 wherein said polyester resin comprises a terpolymer or orthophthalic acid, maleic acid, and propylene glycol and styrene.

23. A product according to claim 22 wherein said terpolymer is about 55% by weight of the total weight of said terpolymer and said styrene and has a conversion of about 98% before being mixed with said styrene.

24. A product according to claim 23 wherein said filler comprises wollastonite and mica.

25. A product according to claim 24 wherein said step of covering said layer of gel coat includes spraying said mixture of resin and filler.

26. A product according to claim 5, 11 or 20 wherein said filler is one which imparts to the filler and resin mixture an ability to dissipate heat and to reduce resin shrinkage during resin cure.

* * * * *